(12) United States Patent
Noriega

(10) Patent No.: US 12,490,727 B2
(45) Date of Patent: Dec. 9, 2025

(54) BETTER BALANCE FISHING POLE

(71) Applicant: Daniel Noriega, Union Hall, VA (US)

(72) Inventor: Daniel Noriega, Union Hall, VA (US)

( * ) Notice: Subject to any disclaimer, the term of this patent is extended or adjusted under 35 U.S.C. 154(b) by 0 days.

(21) Appl. No.: 16/431,987

(22) Filed: Jun. 5, 2019

(65) Prior Publication Data

US 2021/0022330 A1    Jan. 28, 2021

Related U.S. Application Data

(60) Provisional application No. 62/755,100, filed on Nov. 2, 2018.

(51) Int. Cl.
*A01K 87/08* (2006.01)

(52) U.S. Cl.
CPC .................... *A01K 87/08* (2013.01)

(58) Field of Classification Search
CPC ........ A01K 87/06; A01K 87/00; A01K 87/08; A01K 87/02; A01K 97/06; A01K 97/01; A01K 97/08
USPC ....................................................... 43/18.1 R
See application file for complete search history.

(56) References Cited

U.S. PATENT DOCUMENTS

| | | | | |
|---|---|---|---|---|
| 1,923,035 A * | 8/1933 | Hoerle | A01K 87/08 43/22 |
| 2,065,153 A * | 12/1936 | Proudfit | A01K 91/02 43/25 |
| 2,182,901 A * | 12/1939 | Moulton | A01K 87/08 43/22 |
| 2,186,515 A * | 1/1940 | Yuncker | A01K 87/08 43/22 |
| 2,289,216 A * | 7/1942 | Seidel | A01K 87/08 43/22 |
| 2,422,084 A * | 6/1947 | Frank | A01K 87/08 43/22 |
| 2,431,972 A * | 12/1947 | Treadway | A01K 87/08 43/22 |
| 2,433,197 A * | 12/1947 | Carlson | A01K 87/08 43/23 |
| 2,443,567 A * | 6/1948 | Moulton | A01K 87/08 43/22 |
| 2,443,946 A * | 6/1948 | Bozorth, Jr. | A01K 87/08 43/25 |
| 2,454,529 A * | 11/1948 | Thompson | A01K 87/08 43/23 |
| 2,456,681 A * | 12/1948 | Culver | A01K 87/08 43/22 |
| 2,485,144 A * | 10/1949 | Espenship | A01K 87/08 43/22 |
| 2,495,980 A * | 1/1950 | Meierjohan | A01K 87/08 43/22 |

(Continued)

FOREIGN PATENT DOCUMENTS

KR    2003011112 A   *   2/2003  ............. A01K 87/04

*Primary Examiner* — Zoe Tam Tran
(74) *Attorney, Agent, or Firm* — Law Office of Jerry Joseph, PLC; Jerry Joseph

(57) ABSTRACT

A fishing pole where the handle of the pole is offset such that the fishing pole provides a better center of gravity for better balance and feel. The offset also improves alignment of the fishing line with the fishing pole eyelets, allowing for greater distance and better accuracy when casting. Various embodiments are specifically offset to match varying sizes and types of reels, such as spinning reels, bait casting reels, flyfishing reels, and a low profile reels.

14 Claims, 8 Drawing Sheets

(56) References Cited

U.S. PATENT DOCUMENTS

| | | | | |
|---|---|---|---|---|
| 2,504,801 A * | 4/1950 | Carlson | A01K 87/08 | 43/22 |
| 2,514,950 A * | 7/1950 | Harrington | A01K 87/08 | 43/23 |
| 2,534,027 A * | 12/1950 | Irvan | A01K 87/08 | 43/23 |
| 2,547,655 A * | 4/1951 | Mullins | A01K 87/08 | 43/23 |
| 2,583,831 A * | 1/1952 | Goergen | A01K 87/08 | 279/49 |
| 2,680,923 A * | 6/1954 | Hyland | A01K 87/08 | 43/18.1 CT |
| 2,758,592 A * | 8/1956 | Phipps | A01K 87/08 | 126/208 |
| 3,034,798 A * | 5/1962 | Portz | A01K 87/08 | 279/42 |
| 3,068,603 A * | 12/1962 | Zeigler | A01K 87/08 | 43/22 |
| 3,080,673 A * | 3/1963 | Smith | A01K 87/08 | 43/22 |
| 3,181,264 A * | 5/1965 | De Simone | A01K 87/08 | 43/22 |
| 3,213,563 A * | 10/1965 | Zeigler | A01K 87/06 | 43/22 |
| 3,229,405 A * | 1/1966 | Veeder | A01K 87/08 | 43/18.1 R |
| 3,296,732 A * | 1/1967 | Magnus | A01K 87/08 | 43/23 |
| 3,324,589 A * | 6/1967 | Makino | A01K 87/007 | 43/17 |
| 3,418,742 A * | 12/1968 | Yaklyvich | A01K 87/08 | 43/25.2 |
| 3,426,466 A * | 2/1969 | Shepherd | A01K 87/08 | 43/22 |
| 3,451,156 A * | 6/1969 | Barnes | A01K 87/08 | 43/22 |
| 3,744,173 A * | 7/1973 | Puyear | A01K 87/08 | 43/23 |
| D246,181 S * | 10/1977 | Sweeney | D22/142 | |
| 4,651,461 A * | 3/1987 | Williams | A01K 87/08 | 43/22 |
| D300,552 S * | 4/1989 | Worth | 43/18.1 R | |
| 4,848,022 A * | 7/1989 | Ozeki | A01K 97/08 | 43/23 |
| 4,920,682 A * | 5/1990 | Andreasen | A01K 87/08 | 43/22 |
| 5,004,181 A * | 4/1991 | Fowles | A01K 87/08 | 242/225 |
| 5,231,782 A * | 8/1993 | Testa | A01K 87/08 | 43/18.1 R |
| 5,992,079 A * | 11/1999 | Michels | A01K 87/08 | 43/18.1 R |
| 2006/0179705 A1* | 8/2006 | Markley | A01K 87/08 | 43/18.1 R |
| 2006/0230669 A1* | 10/2006 | Markley | A01K 87/08 | 43/25 |
| 2009/0013584 A1* | 1/2009 | Selfors | A01K 87/08 | 43/23 |
| 2010/0050496 A1* | 3/2010 | Huynh | A01K 87/08 | 43/23 |

* cited by examiner

BETTER BALANCE FISHING POLE

CROSS-REFERENCE TO RELATED APPLICATION

The present application claims priority to provisional patent application, Ser. No. 62/755,100 entitled "Better Balance Poll", filed Nov. 20, 2018, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copy-right rights whatsoever. 37 CFR 1.71(d).

FIELD

At least some embodiments disclosed herein relate, in general, to fishing poles or rods, and more specifically to fishing poles configured for improved balance and alignment when a reel is mounted on the fishing pole.

BACKGROUND

Fishing poles are typically straight rods, where a reel is mounted near one end. Reels, however, can be relatively heavy in comparison to the fishing poles they are mounted on. This results in the fishing pole being out of balance due to the misalignment of the reel mass center of gravity longitudinal axis with the fishing pole longitudinal axis, making it more difficult to handle, and more difficult fish with.

SUMMARY

In an embodiment, the present disclosure is directed to a fishing pole where the handle of the pole is offset such that the fishing pole, with a fishing reel mounted to it, provides a better center of gravity by aligning the reel mass center of gravity longitudinal axis with the fishing pole longitudinal axis, providing for better balance and feel. Additionally, this offset handle provides a moment arm from the fishing pole longitudinal axis allowing the angler to prevent the fishing pole from rotating in hand while reeling in a catch. The offset also improves alignment of the fishing line with the fishing pole eyelets, allowing for greater distance and better accuracy when casting.

Various embodiments are specifically offset to match varying sizes and types of reels, such as spinning reels, bait casting reels, flyfishing reels, saltwater reels and a low profile reels.

BRIEF DESCRIPTION OF THE DRAWINGS

The embodiments are illustrated by way of example and not limitation in the figures of the accompanying drawings in which like references indicate similar elements.

FIG. 6 C and D show two embodiments of fishing poles in accordance with present disclosure where the pole is adapted to a deep sea saltwater reel.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In various embodiments, the present disclosure is directed to a fishing pole, with a fishing reel mounted to it, where the handle of the pole is offset such that the fishing pole provides a better center of gravity by aligning the reel mass center of gravity longitudinal axis with the fishing pole longitudinal axis, providing for better balance and feel.

The offset improves alignment of the fishing line with the fishing pole eyelets, allowing for greater distance and better accuracy when casting.

The offset also provides leverage to prevent the pole from rotating when reeling in a catch by providing a moment arm from the fishing pole longitudinal axis. Variations in the shaping are simple to create to accommodate the different styles of fishing and maintain an ergonomically improved fishing pole. In various embodiments, salt water or bait casting style poles can be fabricated with reel on top. In various embodiments, a greater offset on back of handle can provide an armpit fit providing more leverage to prevent the pole from rotating when catching big fish.

Figure 1:
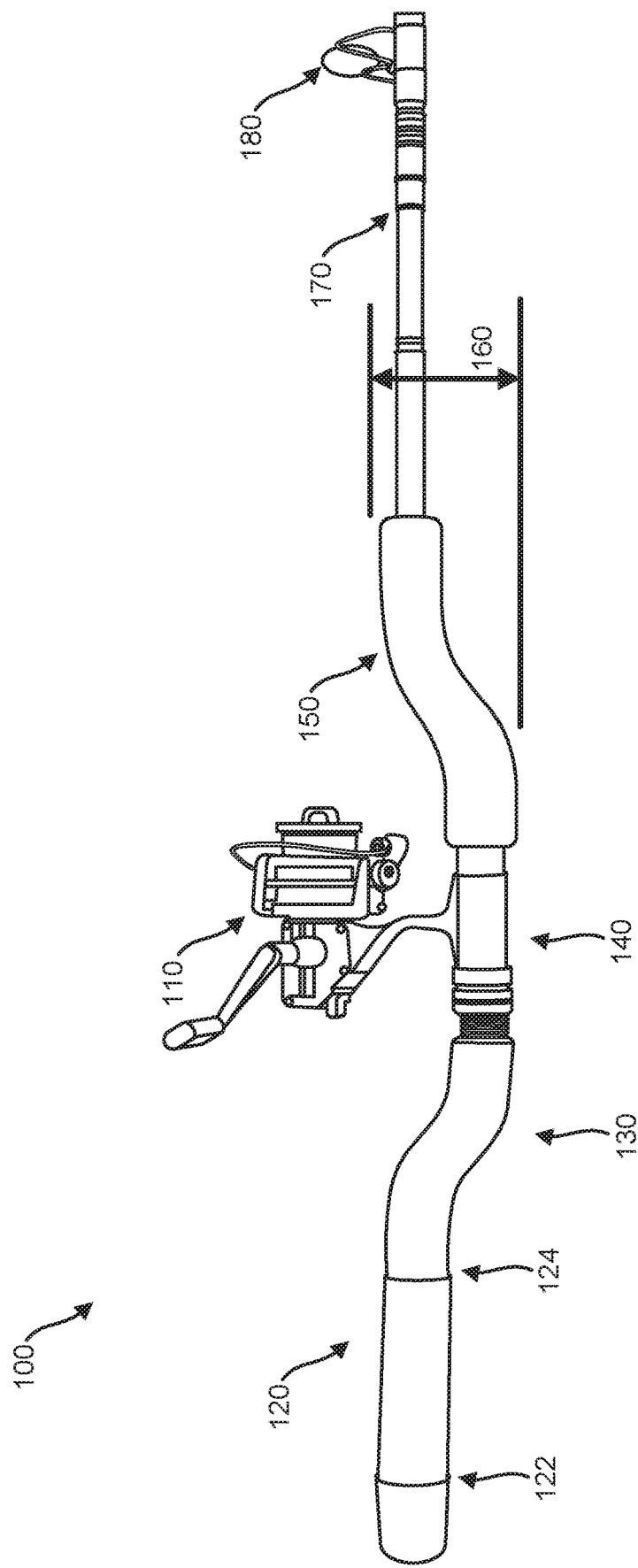
FIG. 1 shows an embodiment of a fishing pole in accordance with present disclosure, wherein the pole is adapted to mount a spinning reel.

FIG. 1 shows an embodiment of a fishing pole 100 in accordance with present disclosure, wherein the pole is adapted to mount a spinning reel 110.

In the illustrated embodiment, the fishing pole 100 has a handle 120 comprising a butt 122 and a foregrip 124. The pole 100 is curved downward at a first position 130, and is curved upwards at a second position 150 such that the reel seat 140 is offset 160 from the handle 120 and the end of the pole 170 by an approximately equal distance. The reel seat 140 in this embodiment accommodates a spinning reel 110.

The spinning reel 110 is seated in a position 140 such that the fishing line (not shown) from the reel is approximately aligned with the eyelets 180 of the pole.

Figure 2B:
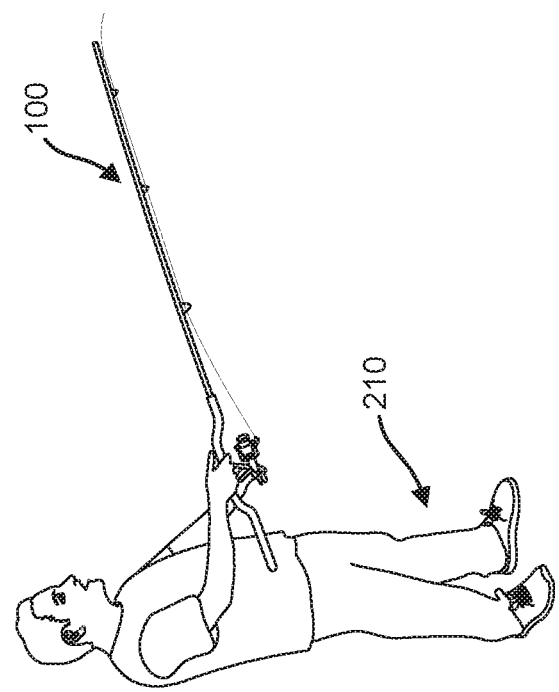
FIG. 2 shows how the fishing pole of FIG. 1 can be used by an angler.
Figure 2A:
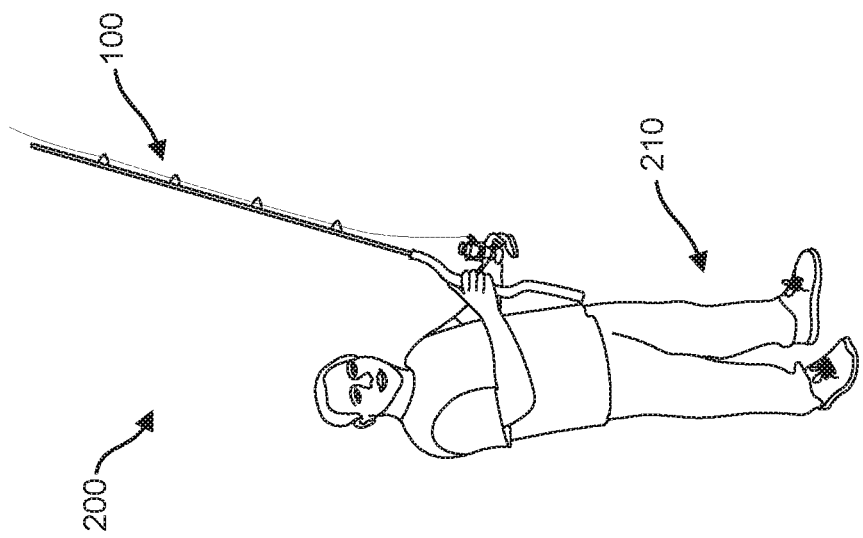

FIG. 2 A and B shows an embodiment 200 of how the fishing pole of FIG. 1 can be used by an angler 210. FIG. 2 A shows the position of the pole 100 before a cast. FIG. 2 B shows the position of the pole 100 after a cast. In this example, the angler 210 holds the pole approximately at the pole's 100 reel seat, and the handle propped on the angler's 210 hip.

Figure 3:
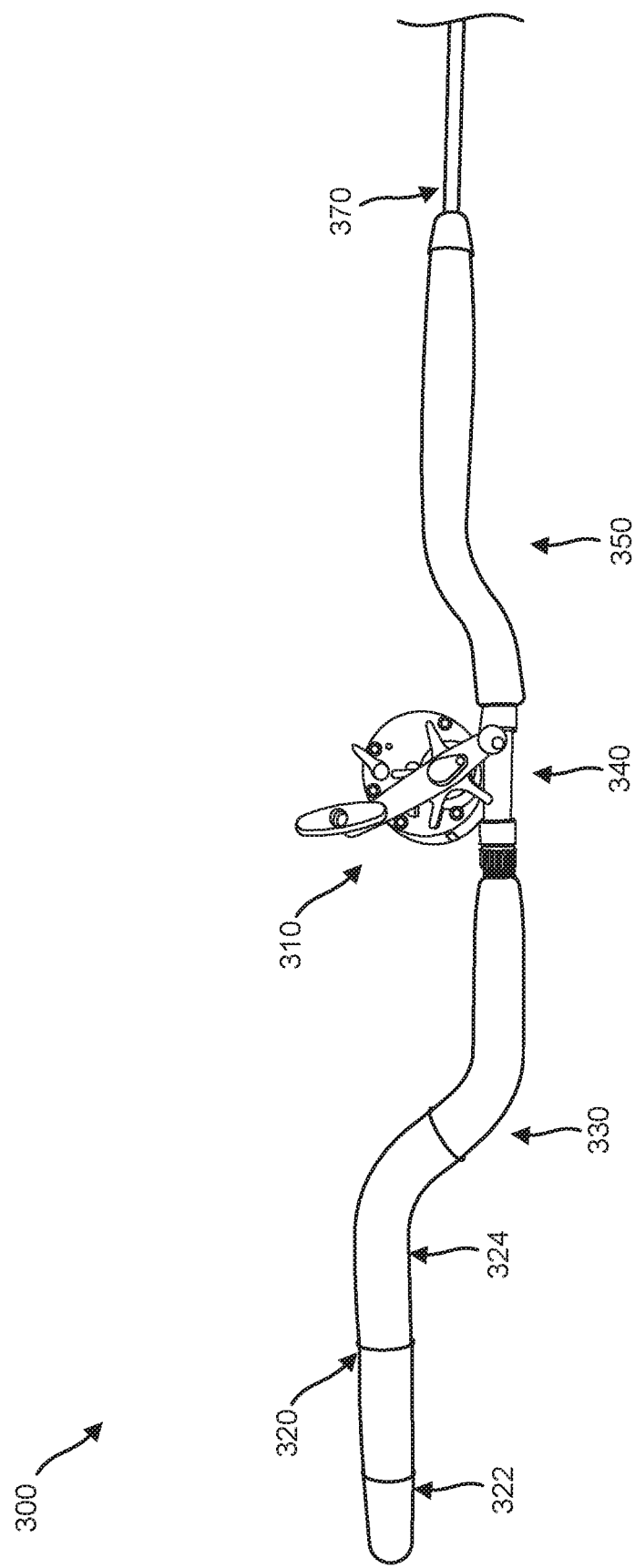
FIG. 3 shows another embodiment of a fishing pole in accordance with present disclosure, wherein the pole is adapted to mount a saltwater or bait casting style reel.

FIG. 3 shows another embodiment of a fishing pole 300 in accordance with present disclosure, wherein the pole is adapted to mount a saltwater or bait casting style reel 310.

In the illustrated embodiment, the fishing pole 300 has a handle 320, comprising a butt 322 and a foregrip 324, which is longer than the handle 120 of the embodiment in FIG. 1. The pole 300 is curved downward at a first position 330, and is curved upwards at a second position 350. In this embodiment, the reel seat 340 is offset from the handle 320 by a distance such that the center of the handle 320 is approximately level with the top of the saltwater bait casting reel 310, and the end of the pole 370 is approximately level with the center of the reel 310.

The saltwater bait casting reel 310 is seated in a position 340 such that the fishing line (not shown) from the reel is approximately aligned with the eyelets of the pole (not shown.). The longer handle 320 allows an angler to hold the pole's 300 handle under the angler's armpit and or propped on the angler'a hip (see FIG. 4 below.)

Figure 4B:
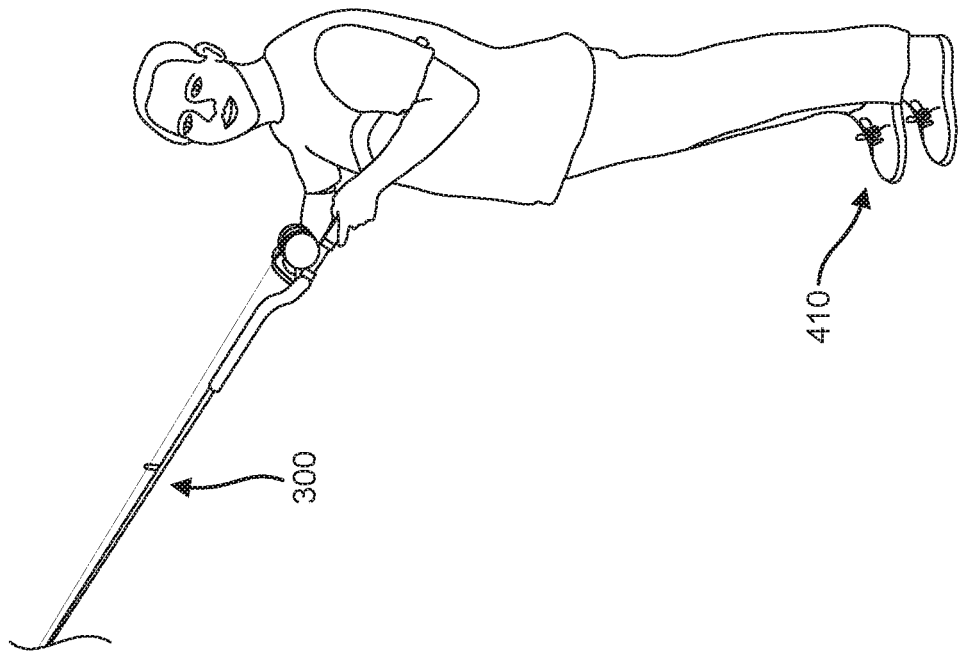
FIG. 4 shows how the fishing pole of FIG. 3 can be used by an angler.
Figure 4A:
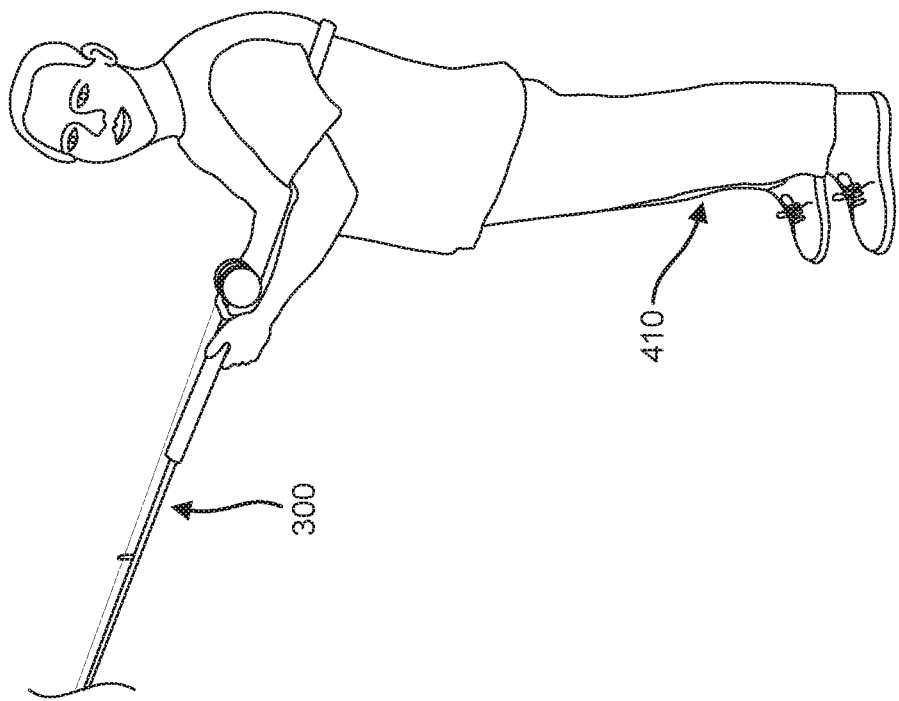
Figure 4C:
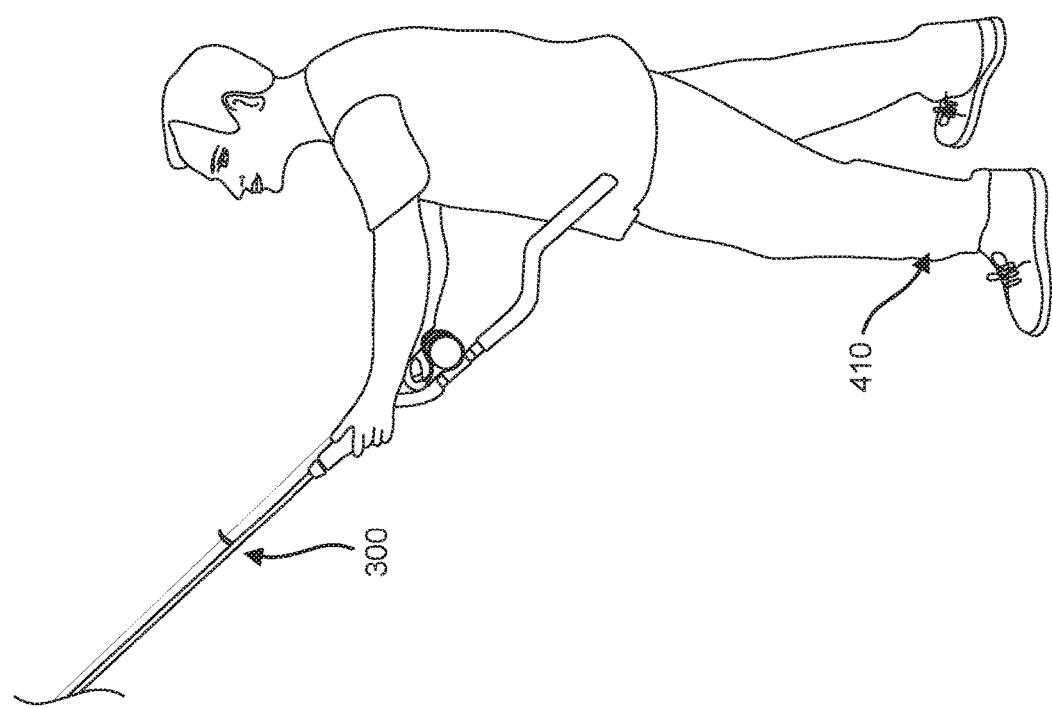

FIG. 4 A-C and shows how the fishing 300 pole of FIG. 3 can be used by an angler 410. FIG. 4 A shows the position of the pole 300 where the angler 410 is holding the pole in front of the reel, and the handle of the reel is positioned under the angler's 410 armpit. FIG. 4 A shows the position of the pole 300 where the angler 410 is holding the pole in front of the reel, and the handle of the reel is positioned under the angler's 410 armpit. FIG. 4 B shows the position of the pole 300 where the angler 410 is holding the pole in back of the reel, and the handle of the reel is positioned under the angler's 410 armpit. FIG. 4 C shows the position of the pole 300 where the angler 410 is holding the pole in front of the reel, and the handle of the reel is propped on the angler's 410 hip.

Figure 5:
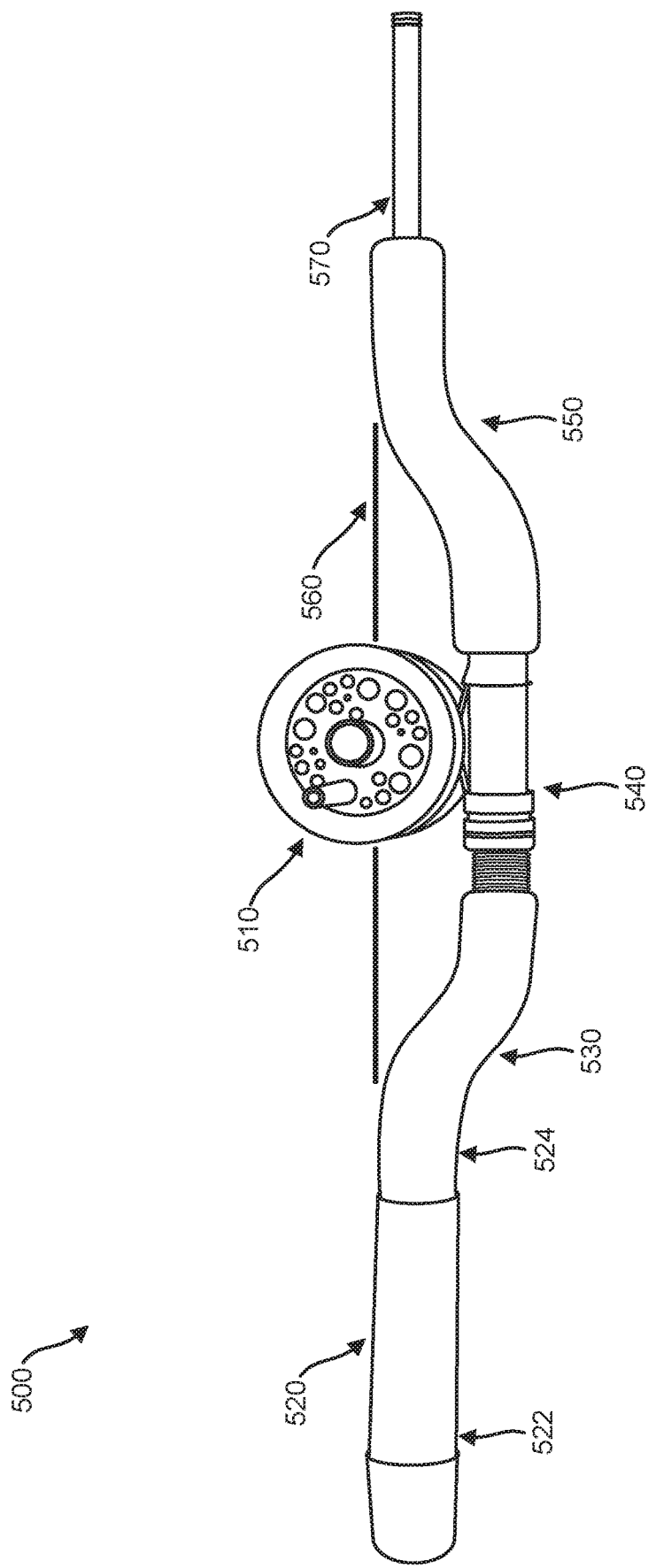
FIG. 5 shows another embodiment of a fishing pole in accordance with present disclosure, wherein the pole is adapted to mount a fly fishing reel.
Figure 6A:
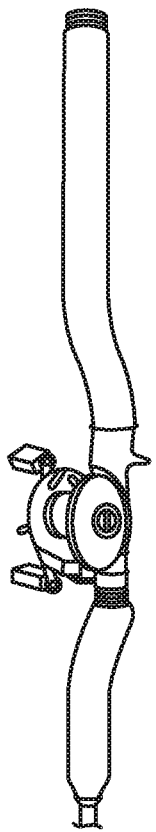
FIG. 6 A and B show two embodiments of fishing poles in accordance with present disclosure where the pole is adapted to a low profile bait casting reel.
Figure 6B:
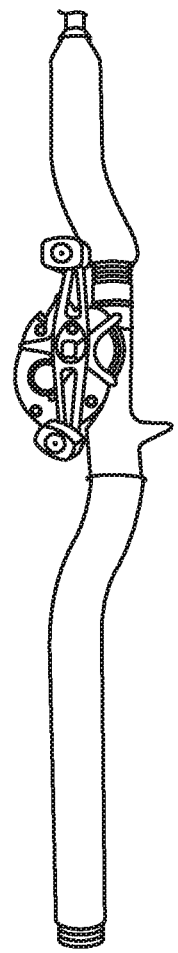
Figure 6C:
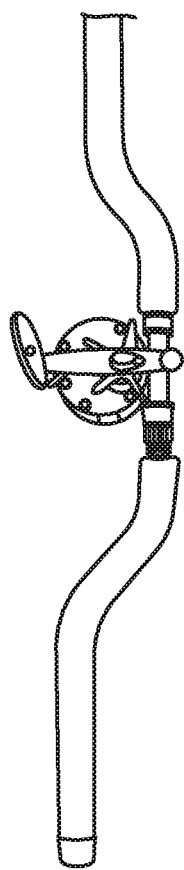
Figure 6D:
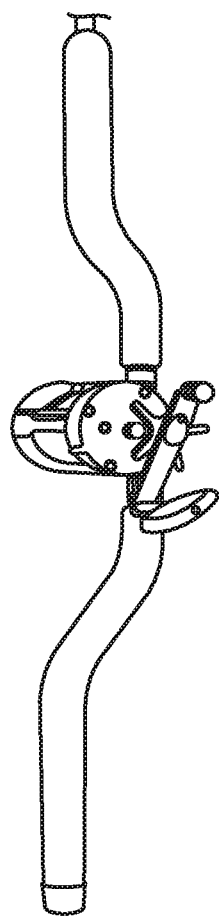

FIG. 5 shows another embodiment of a fishing pole 500 in accordance with present disclosure, wherein the pole is adapted to mount a fly fishing reel 510.

In the illustrated embodiment, the fishing pole 500 has a handle 520, comprising a butt 522 and a foregrip 524. The pole 500 is curved downward at a first position 530, and is curved upwards at a second position 550 such that the reel seat 540 is offset 560 from the handle 520 and the end of the pole 570 by an approximately equal distance. The reel seat 540 in this embodiment accommodates a fly fishing reel 510. The fly fishing reel 510 is seated in a position 540 such that the center of the reel is approximately level with the handle 520 and the end 570 of the fishing pole 500. In an embodiment, the fly fishing reel 510 is seated in a position 540 such that the fishing line (not shown) from the reel is approximately aligned with the eyelets (not shown) of the pole.

FIG. 6 A-D shows four other embodiments of fishing poles in accordance with present disclosure. FIG. A-B show embodiments of the pole adapted to work with low profile bait casting reels, and FIG. C-D show embodiments of the pole adapted to work with deep sea and bait casting fishing reels In an embodiment, the fishing poles of FIG. 1-6 can be easily manufactured using a simple tube bending process that creates the ergonomically friendly fishing pole handle. A molded part using modern plastics or carbon fiber could also be used to create the offset and alignment.

In the foregoing specification, the disclosure has been described with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

The invention claimed is:

1. A fishing pole, comprising:
   a tubular handle portion, comprising a tubular handle butt and a tubular handle foregrip;
   a first tubular curved portion curved in a first direction, wherein a first end of the first tubular curved portion is attached to an end of the tubular handle foregrip;
   a tubular reel seat portion, wherein a first end of the tubular reel seat portion is attached to a second end of the first tubular curved portion;
   a second tubular curved portion, curved in a second direction, wherein a first end of the second tubular curved portion is attached to a second end of the tubular reel seat portion; and
   a pole end portion,
   wherein a first end of the pole end portion is attached to a second end of the second tubular curved portion,
   wherein the tubular reel seat portion is configured for mounting a type of fishing reel that will be mounted on a lower surface of the tubular reel seat portion fishing rod such that the reel will face a ground when the fishing rod is used for fishing, and
   wherein all of the tubular portions are sections of hollow tubes circular in a cross sectional view having substantially a same diameter throughout a longitudinal length of the tubular portions with minor variations from the same diameter of the circular cross sectional view only in the curves in the first and second tubular curved portions due to effects of bending of curves in the first and second tubular curved portions, and have lengths predetermined and configured to permit a user, when fishing, to grasp, the tubular reel seat portion using one hand with fingers wrapped around the lower surface of the tubular reel seat portion and using another hand to operate a handle of the fishing reel for reeling in a fishing line,
   whereby the tubular reel seat is offset from the tubular handle portion by a first offset distance, and the tubular reel seat is offset from the pole end portion by a second offset distance, wherein the first offset distance and the second offset distance are predetermined to match a specific type of fishing reel, such that reel of the specific type, when the reel is mounted in the tubular reel seat portion of the fishing pole, is positioned closer or approximately aligned with a longitudinal axis of the fishing pole.

2. The fishing pole of claim 1, wherein the reel type is a spinning reel and the second offset distance is predetermined such that a fishing line unreels from the spinning reel seated in the reel seat portion to approximately align with line eyelets of the fishing pole.

3. The fishing pole of claim 1, wherein: the reel type is a fly fishing reel and the second offset distance is predetermined such that a fishing line unreels from a fly fishing reel seated in the reel seat portion to approximately align with line eyelets of the fishing pole.

4. The fishing pole of claim 1, wherein the fishing pole is manufactured using a tube bending process.

5. The fishing pole of claim 1, wherein the fishing pole is manufactured using molded parts to create the first offset distance and the second offset distance.

6. The fishing pole of claim 1, wherein the first offset distance and the second offset distance are approximately equal and preset such that a fishing line unreels from a reel seated in the tubular reel seat portion approximately aligns with line eyelets of the fishing pole.

7. The fishing pole of claim 1, wherein at least one of the tubular handle butt portion and the tubular reel seat portion is extended in length, permitting a user to grasp the fishing pole at the tubular reel seat portion by a user's first hand while operating a reel handle to reel in a fishing line with a user's second hand, and the extended length permitting a user to selectively prop the tubular handle butt on a user's hip to obtain additional leverage in holding the fishing pole while operating the reel handle.

8. The fishing pole of claim 1, wherein at least one of the tubular handle butt portion and the tubular reel seat portion is extended in length, the extended length permitting a user to grasp the fishing pole at the tubular reel seat portion by a user's first hand while operating a reel handle to reel in a fishing line with a user's second hand and position the tubular handle portion under a user's armpit, to obtain additional leverage in holding the fishing pole while grasping the fishing pole at the tubular reel seat with the user's first hand and operating the reel handle with the user's second hand.

9. A method of making the fishing pole of claim 1, comprising:
    obtaining a hollow tube of a length predetermined to be configured to permit the user to selectively grasp any of the tubular handle foregrip, the tubular reel seat portion, and the second tubular curved portion while fishing;
    using a tube bender to form the first tubular curved portion and the second tubular curved portion in a manner such as to substantially preserve both the circular cross section and the diameter of the hollow tube; and
    attaching a pole end portion to the bent hollow tube,
    wherein the tubular reel seat portion is further configured for mounting a type of fishing reel to be mounted on a bottom surface of the tubular reel seat portion so that the fishing reel will face downward for fishing and a user will hold the rod for fishing with fingers wrapped around the bottom surface of the tubular reel seat portion.

10. The method of claim 9, wherein the length is also predetermined to permit the user to at least one of selectively prop the tubular handle butt on a user's hip while grasping the fishing pole at the second tubular curved portion and position the tubular handle portion under a user's armpit while grasping the fishing pole at the tubular reel seat portion with fingers wrapped around the bottom surface of the tubular reel seat portion.

11. The fishing pole of claim 1, wherein a longitudinal axis of the tubular handle portion is parallel with a longitudinal axis of the tubular reel seat portion.

12. The fishing pole of claim 1, wherein the first offset distance is approximately equal to the second offset distance.

13. The fishing pole of claim 12, wherein the approximately equal distances provide a configuration to accommodate mounting a spinning reel or a fly fishing reel, such that a fishing line from the spinning reel or fly fishing reel is approximately aligned with eyelets of the fishing pole to reduce drag on the fishing line from the eyelets when the line is cast out during fishing.

14. A fishing pole configured for mounting one of a spinning type reel and fly fishing type reel, the fishing pole comprising:
    a tubular portion; and
    a pole end portion fixably attached to one end of the tubular portion,
    wherein the tubular portion is configured to provide a tubular handle portion, comprising a tubular handle butt and a first tubular curved handle foregrip portion, a tubular reel seat portion configured for mounting a predetermined one of a spinning reel and a fly fishing reel, and a second tubular curved handle foregrip portion, the tubular reel seat portion being offset a first predetermined distance from the tubular handle butt by the first tubular curved handle foregrip portion and a second predetermined distance by the second tubular curved handle foregrip portion,
    wherein the first tubular curved handle foregrip portion and the second tubular curved foregrip portion are curved toward the tubular reel seal portion,
    wherein the offset distance of the tubular reel seat portion due to the second predetermined distance is predetermined to match a spinning or fly fishing type reel in such that the offset distance permits a line of the spinning reel or fly fishing reel mounted on the tubular reel seat portion to approximately align with eyelets positioned along the pole end portion,
    wherein the tubular reel seat portion is configured for mounting one of a spinning reel and a fly fishing reel that will be mounted on a lower surface of the tubular reel seat portion fishing rod such that one of a spinning reel and a fly fishing reel will face a ground when the fishing rod is used for fishing
    wherein the tubular portion is configured to permit a user to selectively grasp the tubular reel seat portion using one hand of the user to hold the fishing pole while using the other hand to operate a handle of the spinning reel or fly fishing reel mounted on the fishing pole to reel in a fishing line, and
    wherein the tubular portion is circular in a cross-sectional view along an entire length of the tubular portion with substantially a same diameter, with minor deviations in the diameter only at curved portions of the first and second tubular curved handle foregrips due to a bending of the tubular portion used to form the first and second tubular curved handle foregrips.

* * * * *